United States Patent Office 3,252,898
Patented May 24, 1966

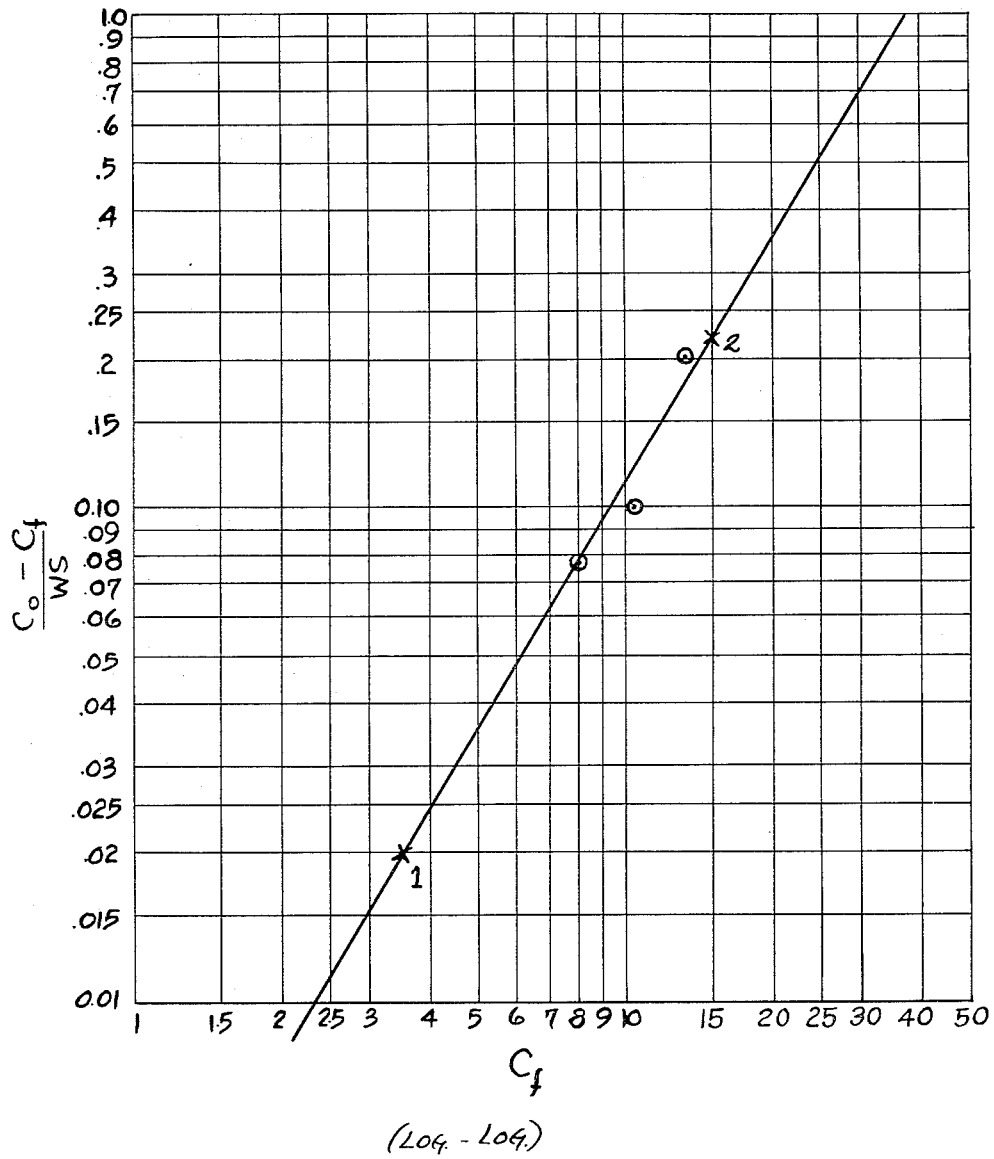

3,252,898
REMOVAL OF SOLUBLE ANIONIC MATERIALS FROM WATER
Donald W. Davis, Clinton, N.J., assignor to Johns-Manville Corporation, New York, N.Y., a corporation of New York
Filed Sept. 27, 1962, Ser. No. 227,642
10 Claims. (Cl. 210—37)

This invention relates to the removal of soluble anionic substances, such as surface active agents from various aqueous media. The invention is particularly applicable to the treatment of laundry waste water, with specific uses in treating alkyl benzene sulfonate-containing waters to remove that contaminant therefrom. This invention also relates to the novel composition for such applications and to the method of preparing same.

With the advent of synthetic detergents in the past decade or so, the role of detergents in water pollution has taken on greater significance. The consequence of such detergents can be appreciated by the fact that current production of syndets, as they are termed, is about 250,000 tons per year in this country alone.

As understood in present day technology, these synthetic detergents are comprised of approximately 15 to 30% surface active agents together with certain other organic and inorganic compounds that are intended to improve the detergent action. The syndets not only exhibit detergent properties but also display stability toward hardness in water, which distinguishes them from other surfactants such as soap. These agents may be classified according to their ionization in water as anionic, cationic, or non-ionic, with the anionics being by far the most important commercially, and the ones most likely to be found in streams and lakes receiving water-borne wastes from cities and industries.

Of the anionic compounds available, alkyl benzene sulfonate predominates in use and for convenience has been commonly referred to as "ABS." Recent measurements of the ABS content in domestic sewage show that it varies from 0.5 part per million or 0.5 milligram per liter, on up.

The reasons for concern may be better understood from the following remarks. In ordinary aerobic stabilization of sewage, part of the organic material is oxidized to carbon dioxide and water and the remainder is converted to new biological cell tissue which can be removed by sedimentation. Many of the surfactants used in syndets are amenable to this type of treatment, and are sometimes referred to as biologically "soft," but certain others are not, and have been termed biologically "hard." This latter group includes the alkyl benzene sulfonates.

As a result of a study of the above facts, among others, there is little doubt that the presence of these compounds continues to increase and continues to be responsible for the principal difficulties attributed to syndets in secondary waste treatment units. For in spite of the fact that approximately one-half of the ABS present in raw sewage can be removed by primary plus secondary treatment, this is not accomplished without some additional cost and the introduction of other problems.

For instance, a number of reports in the literature indicate that there have been increased air requirements in activated sludge treatment of sewage since the advent of syndets. It has been known for a considerable time that the oxygenation of sewage by either bubble or surface aeration is considerably slower than in the case of clean water. This is because of the inherent characteristics of synthetic detergents whereby they reduce oxygen transfer rates and thus effect biological waste degradation in conventional waste treatment. Additionally, their activeness continues to produce foam which is not only aesthetically objectionable, but also reduces surface reaeration. It was, therefore, early observed that effective removal of ABS in water treatment plants did not appear to be practical.

However, various treatment materials including chlorine, dioxide, aluminum sulfate, ferrous sulfate, precipitated calcium carbonate and clay have been investigated but with limited success. Activated carbon had been found to be useful, but high dosages were required. Accordingly, with the absence of effective economical removal means, pollution of water supplies due to addition of alkyl benzene sulfonate has become quite severe in the United States, to the extent that in many areas much of the ground water table has been polluted with ABS from septic system overflow.

The purpose of this invention was therefore to provide a means to reduce the concentration of ABS and/or other anionic surface active agents to low levels by practical means and at a reasonable cost. It was discovered that such a reduction is possible by treating the water with cationic acting materials whereby the anionic material is removed by means of chemisorption by the cationic groups. These treating materials are prepared by coating an absorbent material such as diatomaceous silica, perlite, hydrated silicates and the like, with a water insoluble polymer such as an ion exchange resin containing the active groups and insolubilizing the coating. Alternatively, physical mixtures of the polymer and a powdered absorbent material may be used within the scope of this invention. Insolubility in water is necessary in order to prevent the formation of turbid complex that would not be readily removable by filtration. The cationic ingredients chemisorb the anionics in the water, and the material is thereafter filtered to produce a purified water.

The preferred cationic groups include primary, secondary, and tertiary amine, quaternary ammonium, or mixtures thereof. However, the tertiary sulfonium, and quaternary phosphonium containing materials are also useful. Ion exchange resins containing these groups have been found particularly satisfactory; the strong base anion exchange resins, containing either tetra-alkyl ammonium or trialkylalkanol ammonium groups, resins containing the weakly basic groups or mixtures of the weakly basic and strongly basic groups were all found effective.

As part of this discovery, it has been determined the proper control of the particle size of the resin, i.e., the outside surface area of the resin, is most important in order to control ultimate capacity of the resins to remove the particular surface active agent.

The amount of resin necessary to reduce the ABS or other anionic agent to a desired level is dependent on many facts including these and may be expressed by mathematical formulae as hereinafter more explicitly explained.

OBJECTS

It was therefore a principal object of this invention to provide an effective and economical means for the removal of alkyl benzene sulfonate and/or other anionic surface-active agents from water.

It was another object of this invention to provide an effective means for reducing the ABS level in waste water supplies.

It was a further object of this invention to provide an economical means for reducing the ABS level in waste water supplies.

Another object of this invention was the provision of materials to accomplish the economical and practical removal of such surfactants from water.

Other objects and further scope of applicability of the present invention will become apparent from the detailed description given hereinafter.

BRIEF DESCRIPTION OF THE INVENTION

It has now been discovered that the foregoing objects may be satisfied by providing a process for the treatment of alkyl benzene sulfonate (ABS)—or other anionic surfactant—containing waste water with a physical mixture of anionic exchange resin and a filter aid, or alternatively by treatment with a resin-coated filter aid.

As has been explained above, both strong base and weak base exchange resins are useful. Again as explained above, the particle size and more particularly, the specific surface of the resin, is most important. This is so because the greater the specific surface, the greater number of active sites per gram of resin exposed. Care must be taken, however, so as not to permit the particles to become so small as to become difficult to remove them from the resin in solution. It has been determined that an average particle size of about 1 to about 40 microns as determined by the air permeability on a Fischer subsieve sizer at a porosity of 0.45 is effective.

The amount of resin necessary to produce a desired final concentration of anionic detergent may be determined from the following equation:

$$W = \frac{C_o - C_f}{SK(C_f)^{1/n}}$$

wherein W is the weight of resin needed, expressed in grams/l.; $C_o$ is the original anionic detergent concentration expressed in mg./liter; $C_f$ is the final anionic detergent concentration expressed in mg./liter; S is a specific surface area of the resin expressed in square centimeters per gram and K and $1/n$ are constants for the particular resin use.

The determination of the constants K and $1/n$ is made using a modification of the classic Freundlich Absorption Isotherm. This may be expressed logarithmically as:

$$\ln \frac{(C_o - C_f)}{WS} = \ln K + 1/n \ln C_f$$

Wherein $C_o$, $C_f$, W and S are as above. In effect WS equals the square centimeters of resin per unit quantity of liquid.

Consequently, using two or three points on a standard solution and preferably a medium which is to be treated, one may determine the two constants K and $1/n$ for a given resin and a given system. Once having determined the two constants they may be employed for that resin in the first above-mentioned formula for determining the amount of resin necessary for a unit quantity of liquid and the desired final concentration. Because of the variation in resin and water characteristics, the use of these formulae will produce results which are generally within 20% of the actual amount necessary to produce the desired results.

GENERAL DESCRIPTION OF THE INVENTION

While the above-described processes are applicable to all levels of ABS or surface activating concentration, for economical reasons among others, it is desirable to first treat the contaminated water with alum or alum in combination with ferric salts and/or coagulant aids to lower the ABS concentration to about 20 mg./liter or lower. This pretreatment may be illustrated as follows: Alum dosage may vary between 500 and 3000 mg./liter with water containing about 100 mg./l. ABS from a built detergent containing 16.2% ABS anionic detergent. It was found that the floc formed in this case from the reaction with the alum contained, after ignition to remove the carboxymethyl cellulose portion, approximately 30% aluminum measured as $Al_2O_3$, 12% phosphorous measured as such, 24% silicon measured as $SiO_2$ and small quantities of iron and sodium, which is quite different from the usual aluminum hydrate floc formed during water treatment in normal water treatment plants. This pretreatment reduced the anionic surface active agent level of the solution to approximately 14 to 20 mg./liter. The solution is then ready for treatment with an anion exchange resin coated on filter aid or a mixture of powdered anion exchange resin and filter aid. Final ABS level depends on the amount of resin used but a typical final concentration may vary between 0.1 mg./l. and the starting concentration.

A more complete understanding of the invention may be obtained by reference to the following examples of operations within the scope of this invention. In each of these examples all parts and percentages are by weight unless otherwise indicated.

Example I

Two thousand mg./liter of commercial alum were added to a solution containing 100 mg./l. of ABS from a typical built anionic detergent in tap water at 100–120° F. Slow agitation was maintained for 5 minutes and the floc was allowed to settle for 1 hour. One liter of clear supernatant liquid which then contained 17 p.p.m. ABS was then treated with 20 mg. of an anionic exchange resin containing quaternary ammonium functional groups in the chloride form having a specific surface of 4970 cm.$^2$/g. as determined by the Fischer subsieve sizer at a porosity of 0.45. Additionally, 500 mg. of "Hyflo Super-Cel," a flux calcinated diatomaceous silica sold under that trademark, was added. After a 5 minute contact period, the resin-filter aid mixture was removed by filtration. The final ABS content was 3 mg./l.

Examples II–X

Nine additional tests were run using mixtures of the filter aid and a strong, intermediate and weak base resin. Further, the specific surface area and therefore the particle size of the resin were varied to demonstrate the effect of same on the removal of ABS. In all tests a liter solution containing 20 parts per million of ABS and a molecular weight of 348 and at a pH of 4 was treated. In the test, the specific surface of each sample was determined in accordance with the formula:

$$S = \frac{6 \times 10^4}{D_m \times p}$$

wherein $D_m$ was the mean diameter micron of the particle as determined by the Fischer subsieve sizer at a porosity of 0.45 and $p$ was the true density of the resin. From the data it is clear that as particle size is reduced, the specific surface is increased and consequently, the resin becomes more effective, i.e., reduces the final ABS content to a lower level.

The actual final effect on the ABS removal is also influenced by the capacity of the resin and its category, i.e., strong, intermediate, or weak. In Examples II through V a strong base Type 2 resin, Duolite A102D, containing trialkylalkanol ammonium chloride groups was used having the capacity of 4.07 milliequivalents per gram. In Examples VI and VII a mixed weak and strong resin, Duolite A30B, was used which contains tertiary amine and quaternary ammonium as a functional group and having a capacity of 9 milliequivalents per gram. In Examples VIII through X a weak base resin Amberlite XE220 resin was used and contained amine as the functional group and had a capacity of 5.86 milliequivalents per gram. The results of Examples II through X are set out below in Table 1. In each example the same amount of resin, 30 mg., was used.

TABLE I

| Example | Specific Surface, cm.²/g. | Average Particle size, microns | Final ABS Level mg./l. | Mg. Resin to remove 1 mg. ABS |
|---------|---------------------------|--------------------------------|------------------------|-------------------------------|
| II      | 6,490                     | 8.4                            | 7.3                    | 2.4                           |
| III     | 3,640                     | 15.0                           | 9.1                    | 2.8                           |
| IV      | 2,730                     | 20.0                           | 10.0                   | 3.0                           |
| V       | 1,520                     | 36.0                           | 12.0                   | 3.8                           |
| VI      | 4,000                     | 12.8                           | 4.2                    | 1.9                           |
| VII     | 3,790                     | 13.5                           | 8.2                    | 2.5                           |
| VIII    | 3,580                     | 14.7                           | 10.5                   | 3.2                           |
| IX      | 1,610                     | 33.0                           | 14.5                   | 5.4                           |
| X       | 1,105                     | 48.0                           | 16.0                   | 7.5                           |

Additional examples were run to demonstrate the effectiveness of the invention.

Example XI

A liter of detergent solution at 110° F containing 100 mg./l. of alum, 30 mg./l. of Duolite A102D and 200 mg./l. of diatomaceous silica filter aid, was mixed for 20 minutes and a floc allowed to form and settle. The supernatant liquor was then filtered and was found to contain 12.7 mg./l. ABS.

Example XII

Fifteen hundred milligrams of powdered alum were added to one liter of detergent solution containing 100 mg./l. of ABS using agitation. A floc was allowed to form over a 20-minute period, and removed by sedimentation. Thirty mg./l. of Duolite A102D and 270 mg./l. of diatomaceous silica filter aid were added to the clear supernatant liquid and allowed to react for 5 to 10 minutes. Final ABS concentration after filtration was 3 parts per million.

Examples XIII

Example XII was repeated replacing the strong basic resin with Duolite A30G a resin having a specific surface of 4000 cm.²/gm. Upon completion of the filtration cycle, 4.2 mg./l. of ABS remained.

Example XIV

Again the process of Example XII was repeated employing the Amberlite XB220 resin in a specific surface of 3580 cm.²/g. The final ABS concentration was 8.9 mg./l.

While the above examples indicate the use of a mixture of the anionic exchange resin, equally satisfactory results have been obtained from coated filter aid. The filter aid is treated by spraying with a ball milled-emulsion of the resin reduced to the desired particle size between 1 and 40 microns which gives the desired surface area for the resin. The spray coated filter aid is then dried if necessary for handling.

The ion exchange resins used herein are made by first forming insoluble infusible polymer in which active acidic or basic groups can be introduced by appropriate chemical reaction. This polymer matrix must be physically and chemically resistant to many conditions imposed upon it both during the reaction and in the subsequent use of the product.

Anionic exchange resins include a class of strong base which rely on quaternary ammonium. These functional groups are attached to resin matrices such as polystyrene to give products which behave like insoluble sodium hydroxide or sodium chlorides. Also usable are the weak base, acid adsorbent materials which contain primary amine, secondary amine, or tertiary amine functional groups. A variety of weakly basic exchanges are available. The more common of them contain mixtures of secondary and tertiary amine functional groups. In general acid adsorbents containing only tertiary amine groups are widely used because of their greater chemical and thermal stability.

Lastly, the intermediate base groups are also useful. These are resins containing a mixture of weakly basic and strongly basic groups. As expected, their properties are intermediate between the two main classes of anion exchange resins.

The general properties of these resins are known and are characterized in terms of their total capacity to exchange ions per unit of resin volume or per unit of weight. These data describe the potential for exchange and are independent of conditions of use. They are to be distinguished from breakthrough capacities which define quantitatively the ability of a resin to remove a certain constituent or constituents under specified conditions to a predetermined level. The total capacity of a given resin is a constant; the breakthrough capacity varies with conditions of use and requisite performance.

Total capacities are generally expressed in terms of milliequivalents per milliliter or milliequivalents per gram. In obtaining this data, volumes are measured with fully water-swollen resins. Variations are known. For example, in the use of weakly basic resin, volumes are measured in the free-base form. Yet weights are obtained with the dry, chloride form to avoid chemical changes which frequently occur during oven drying of the free-base form.

The capacity of various resins has been illustrated by the above examples. With particular regard to the formulae set out above for determining the amount of the resin to use to produce a final ABS level, the following is to be noted.

A sample of an ABS contaminated water source was treated with the Duolite A102D resin with a measured specific surface area of 2727 cm.²/g. The initial ABS concentration was 18.6. Three points were determined for the Freundlich Absorption Isotherm; having a final ABS concentration of 8.1, 10.5 and 13.1 mg./l. respectively. These final concentrations were achieved using 50, 30 and 10 mg. of resin respectively. Using the weights and final concentrations, $$\frac{C_o - C_f}{WS}$$

was determined for each of the samples. On Graph 1 the final concentration ($C_f$) was then plotted on log-log paper versus the $$\frac{C_o - C_f}{WS}$$

per the Freundlich technique. Selecting two points on the graph, $X_1$ and $X_2$, the constants K and $1/n$ were determined using the modified Freundlich logarithmic formulae:

$$\ln \frac{(C_o - C_f)}{WS} = \ln K + 1/n \ln C_f$$

as follows: Inserting the figures into the equation the two points may be expressed:

(1)     $\ln 0.02 = \ln K + 1/n \ln 3.5$ (2)     $\ln 0.22 = \ln K + 1/n \ln 15$

Substituting the appropriate logs:

(1)     $-3.912 = \ln K + 1.253 \, 1/n$ (2)     $-1.514 = \ln K + 2.708 \, 1/n$

Solving for $1/n$:

$$2.398 = 1.455 \, 1/n$$

or $$1/n = 1.648$$

Substituting this value of $1/n$ in Equation 1:

$$\ln K = 3.912 - 1.648 \, (1.253)$$

$$\ln K = -5.977$$

$$K = 2.54 \times 10^{-3} \text{ or } 0.00254$$

Using these determined constants, Example IV wherein the same resin was used can be checked:

$$W = \frac{C_o - C_f}{SK(C_f)^{1/n}}$$

$$= \frac{20-10}{2730(.00254)10^{1.648}}$$

$$= \frac{10}{2.73 \times 10^3 \times 2.54 \times 10^{-3} \times 44.5}$$

$$= \frac{10}{308.4}$$

$$= .0324 \text{ g.}$$

This is equal to 32 mg. which checks with the 30 actually used in Example IV.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of treating anionic surfactant-containing water to remove said anionic surfactant therefrom, comprising adding to said water anionic exchange resin and filter aid, the approximate amount of anion resin to be added in accordance with the following formula:

$$W = \frac{C_o - C_f}{SK(C_f)^{1/n}}$$

wherein $C_o$ is the original anionic surfactant concentration expressed in mg./l; $C_f$ is the final anionic surfactant concentration expressed in mg./l., S is the specific surface area of the exchange resin expressed in cm.$^2$/g. and K and $1/n$ are constants for the particular resin determined from a modified Freundlich Absorption Isotherm expressed as:

$$\ln \frac{(C_o - C_f)}{WS} = \ln K + 1/n \ln C_f$$

wherein $C_o$, $C_f$, W and S are as above and wherein K and $1/n$ are determined by sampling a standard solution, and wherein said anionic exchange resin has an average particle size of between about 1 and about 40 microns as determined by the air permeability on a Fischer subsieve sizer at a porosity of 0.45.

2. A method as defined in claim 1 wherein the anionic exchange resin is selected from the group consisting of primary, secondary and tertiary amines, quaternary ammonium, quaternary phosphonium, tertiary sulfonium and mixtures thereof.

3. A method as defined in claim 1 wherein the filter aid is selected from the group consisting of diatomaceous silica, perlite, hydrated silicates and mixtures thereof.

4. A method as defined in claim 1 wherein the anionic exchange resin is a coating upon the filter aid.

5. The method of claim 1 wherein the anionic substance is alkyl benzene sulfonate.

6. A product comprising filter aid coated with anionic exchange resin wherein the resin has an average particle size of between 1 and 40 microns.

7. The product of claim 6 wherein the filter aid is selected from the group consisting of diatomaceous silica, perlite, hydrated silicates and mixtures thereof.

8. The product of claim 6 wherein the anionic exchange resin is selected from the group consisting of primary, secondary and tertiary amines, quaternary ammonium, tertiary sulphonium, quaternary phosphonium and mixtures thereof.

9. A method as defined in claim 1 wherein the anion exchange resin and filter aid are added to said water as a physical mixture.

10. A product comprising a physical mixture of filter aid and anion exchange resin having an average particle size of between 1 and 40 microns.

References Cited by the Examiner

UNITED STATES PATENTS

| | | | |
|---|---|---|---|
| 2,469,694 | 5/1949 | Lundberg | 210—37 |
| 2,503,769 | 4/1950 | Roberts | 210—37 |
| 2,941,006 | 6/1960 | Greene | 252—436 |
| 3,011,909 | 12/1961 | Hart et al. | 117—72 |
| 3,039,889 | 6/1962 | Keim | 117—72 |
| 3,058,839 | 10/1962 | Kemp | 117—72 |

MORRIS O. WOLK, *Primary Examiner.*